March 7, 1944.    A. PINSON    2,343,833
HATCH COVER
Filed Dec. 15, 1941
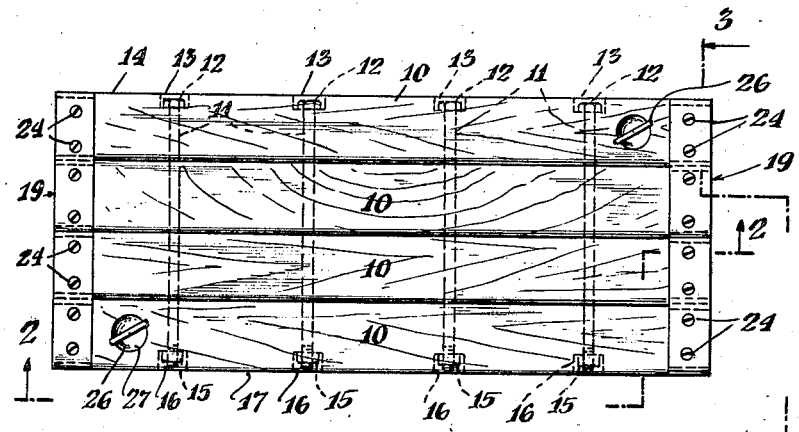
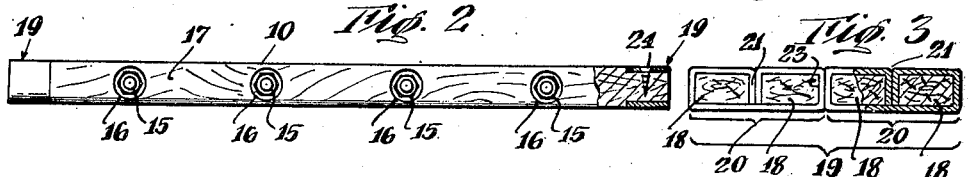
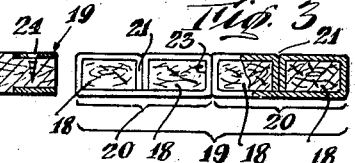
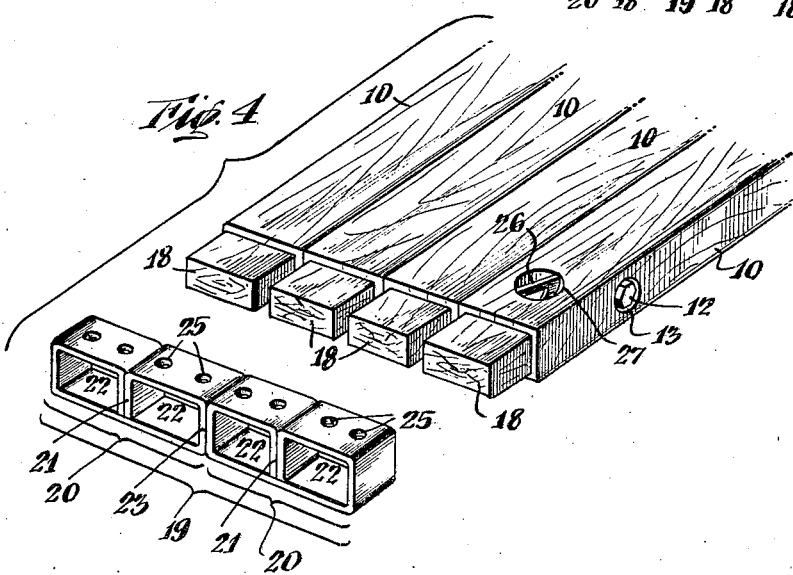
INVENTOR.
Abraham Pinson
BY
Harold Kaplan
ATTORNEY Patented Mar. 7, 1944

2,343,833

UNITED STATES PATENT OFFICE 2,343,833

HATCH COVER

Abraham Pinson, Brooklyn, N. Y.

Application December 15, 1941, Serial No. 422,966

5 Claims. (Cl. 20—35)

The present invention relates to hatch covers such as are used for the decks of ships and for the roofs and floors of buildings to cover openings or recesses therein.

It will be apparent to those familiar with the types of wooden hatch covers presently in use that such covers are deficient in many respects and that considerable improvement in their structure is needed to eliminate much of the wear and tear due to handling and exposure from which such covers commonly suffer. It is well known that the usual wooden hatch cover as a whole, is susceptible particularly to distortion, warping and splitting and also that the edges of the cover are especially subject to wear and breakage necessitating frequent repair and renewal.

It is therefore the principal object of the present invention to provide a hatch cover of improved construction which will eliminate the deficiencies incident to the usual type of wooden cover. A particular object of the present invention is to provide a hatch cover of rigid and sturdy construction having suitable reinforcing and protecting means designed to prevent distortion, warping and splitting and to afford protection against excessive wear and breakage. A further object of the invention is to provide a hatch cover having the aforementioned characteristics, which is simple in construction, economical to manufacture and durable in use.

Other objects and advantages of the present invention will in part be pointed out hereinafter as the description of the preferred physical embodiment thereof proceeds, and will in part be apparent to those familiar with the art to which the present invention relates.

With the above and other objects in view the present invention consists of the novel features of construction, combination of elements and arrangement of parts hereinafter described and illustrated in the accompanying drawing.

In the accompanying drawing which forms an integral part of this disclosure,

Fig. 1 is a top plan view of a hatch cover constructed in accordance with the present invention;

Fig. 2 is a side edge view thereof, shown partly in cross-section along the line 2—2 of Fig. 1;

Fig. 3 is an end view thereof, shown partly in cross-section along the line 3—3 of Fig. 1; and Fig. 4 is an exploded perspective view of one end portion of the hatch cover shown in Fig. 1.

Referring now in detail to the drawing which illustrates the preferred physical embodiment of my invention, wherein like reference characters indicate corresponding parts throughout the several views, it will be seen that my improved hatch cover consists of several wooden planks or timbers 10 arranged in edge to edge coplanar relation which are joined together to form a unitary structure by means of a series of suitable bolts 11 extending through transverse bores provided at spaced intervals in the planks. The heads 12 of the bolts are sunk into recesses 13 formed in one of the outer edges 14 of the assembled planks while the nuts 15 which are fitted on the ends of the bolts are sunk into recesses 16 formed in the opposite outer edge 17 of the assembled planks, so that the bolts do not project beyond the outer edges of the cover.

In accordance with the present invention, the end portions 18 of each of the planks 10 are mortised as shown in Fig. 4 and metal plate collars 19 are fitted upon and secured to the ends of the assembled planks. The collars 19 are preferably composed of a plurality of sections 20 each of which is designed to embrace the end portions of two adjacent planks and to extend between the said planks. Accordingly each section 20 is preferably fabricated from a length of metal plate which is bent around to form a rectangular shaped collar element as shown in Figs. 3 and 4, the end portions of the plate being bent inwardly midway between opposite sides and united together as by welding, to form a vertically disposed partition or flange 21, whereby there is provided a pair of compartments 22, each of which is adapted to receive the mortised end portion 18 of one of the planks. The collar sections 20 are disposed in side by side coplanar relation and the abutting sides are united together as by welding, to form a vertically disposed flange 23 at the junction of the sections.

The external width and deep dimensions of the collars 19 correspond to the width and depth of the cover, so that the outer surfaces of the collars lie flush with the upper and lower surfaces and with the outer edges of the assembled planks. The collars are secured to the end portions 18 of the planks by means of suitable studs 24 passing through holes 25 in the collars and into the planks, the heads of the studs being countersunk into the collars.

To complete the hatch cover structure, suitable lifting handles 26 of the usual form are provided preferably at diagonally opposite corners of the cover and are sunk into recesses 27 in the upper surface of the cover to normally lie flush with said surface.

It will be observed from the foregoing description of my invention that the collars which are fitted over the end portions of the planks not only encircle the assembled planks and thus protect the end portions and outer edges of the cover against wear and breakage, but also have vertically disposed flanges which extend between the planks, serving as effective reinforcing means for the individual planks to prevent warping, distortion and splitting. The fabrication of the collars need not, however, be restricted to the particular form hereinabove described and illustrated in the drawing, provided that the principle of reinforcing embodied in the present invention is maintained. For instance, the collars may be formed of a plurality of sections, each consisting of a rectangular shaped collar element adapted to fit over and completely encircle the mortised end portion of one of the planks, the several sections being united as by welding in side by side coplanar relation to constitute the entire collar. Other ways of forming the collars are contemplated which will nevertheless come within the spirit and scope of the present invention.

It will also be understood that the number of planks used to constitute the hatch cover may be varied and that any plural number of such planks may be used as will meet the particular requirement. Likewise, the number of sections required to constitute the protecting and reinforcing collars will vary accordingly.

In view of the embodiment of my invention as hereinabove disclosed, it will be evident that my improved hatch cover is of simple yet rigid and sturdy construction, affording distinct advantages over presently existing wooden hatch covers.

Having thus described and illustrated my invention, what I claim as new and desire to secure by Letters Patent is:

1. A hatch cover or the like comprising a plurality of wooden planks assembled in edge to edge coplanar relation and secured together by fastening bolts extending transversely through said planks, and metal plate reenforcing collars fitted upon and secured to the end portions of the assembled planks, each of said collars comprising a section formed to embrace two adjacent planks and to extend vertically between said planks.

2. A hatch cover or the like comprising a plurality of wooden planks assembled in edge to edge coplanar relation and secured together by fastening bolts extending transversely through said planks, each plank having reduced end portions, and metal plate reinforcing collars fitted upon and secured to the end portions of the assembled planks, said collars comprising a plurality of sections each formed to embrace two adjacent planks and to extend vertically between said planks, the outer surfaces of said collars being disposed flush with the outer surfaces of the planks.

3. A hatch cover or the like comprising a plurality of wooden planks assembled in edge to edge coplanar relation and secured together by fastening bolts extending transversely through said planks, each plank having mortised end portions, and metal plate reenforcing collars fitted upon and secured to the end portions of the assembled planks, said collars comprising a plurality of sections each formed to embrace two adjacent planks and to extend vertically between said planks thereby providing compartments for receiving the end portions of the planks respectively.

4. A hatch cover or the like comprising a plurality of wooden planks assembled in edge to edge coplanar relation and secured together by fastening bolts extending transversely through said planks, and metal plate reenforcing collars fitted upon and secured to the end portions of the assembled planks, said collars comprising a plurality of sections each formed to embrace two adjacent planks and to extend vertically between said planks, the abutting sides of the several sections being welded together to provide a unitary member, having vertically disposed reenforcing flanges extending between the adjacent pairs of planks.

5. A hatch cover or the like comprising a plurality of wooden planks assembled in edge to edge coplanar relation and secured together by fastening bolts extending transversely through said planks, each plank having reduced end portions, and a plurality of metal plate reenforcing collars each fitted upon and secured to an end portion of one of said planks, the abutting sides of the several collars being welded together to provide a composite collar structure having vertically disposed reenforcing flanges extending between the planks.

ABRAHAM PINSON.